United States Patent
Saini et al.

(10) Patent No.: US 11,560,026 B2
(45) Date of Patent: Jan. 24, 2023

(54) SYSTEM AND METHOD FOR HITCH ANGLE ESTIMATION

(71) Applicant: GM Global Technology Operations LLC, Detroit, MI (US)

(72) Inventors: Utkarsh Saini, Claremont (CA); Avesta Goodarzi, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 200 days.

(21) Appl. No.: 17/091,059

(22) Filed: Nov. 6, 2020

(65) Prior Publication Data

US 2022/0144028 A1    May 12, 2022

(51) Int. Cl.
  *B60D 1/32*  (2006.01)
  *B62D 15/02*  (2006.01)
  *B60D 1/26*  (2006.01)

(52) U.S. Cl.
  CPC .............. *B60D 1/32* (2013.01); *B60D 1/26* (2013.01); *B62D 15/021* (2013.01)

(58) Field of Classification Search
  CPC ...... B62D 15/021; B62D 15/024; B60D 1/26; B60D 1/32
  See application file for complete search history.

(56) References Cited

U.S. PATENT DOCUMENTS

| | | | |
|---|---|---|---|
| 2008/0231701 A1* | 9/2008 | Greenwood | G01B 11/272 348/148 |
| 2017/0008560 A1* | 1/2017 | Kyrtsos | B60W 10/20 |
| 2017/0158233 A1* | 6/2017 | Herzog | B62D 15/024 |
| 2017/0174130 A1* | 6/2017 | Hu | B60C 5/00 |
| 2017/0334484 A1* | 11/2017 | Koravadi | G08G 1/168 |
| 2018/0127024 A1* | 5/2018 | Pourrezaei Khaligh | B60D 1/245 |
| 2018/0312195 A1* | 11/2018 | Tae | B60W 10/20 |

FOREIGN PATENT DOCUMENTS

| | | | | |
|---|---|---|---|---|
| WO | WO-2016058595 A1 * | 4/2016 | | B62D 13/06 |
| WO | WO-2016168650 A1 * | 10/2016 | | B60W 30/06 |
| WO | WO-2019073885 A1 * | 4/2019 | | B60R 1/00 |
| WO | WO-2019179724 A1 * | 9/2019 | | B62D 13/00 |

* cited by examiner

Primary Examiner — Jacob B Meyer
Assistant Examiner — Ryan Edward Hardy
(74) *Attorney, Agent, or Firm* — Vivacqua Crane PLLC (57) ABSTRACT

A system for estimating a hitch angle includes a control module with memory for storing programmatic control logic, a processor for executing the control logic, and one or more input/output (I/O) ports. Wheel speed sensors on a trailer communicate with the processor via the I/O ports. A trailering application defines a portion of the control logic and has at least first, and second control logics. The first control logic estimates the hitch angle from a first term, a second term and physical parameters of the vehicle and trailer. The second control logic provides the estimated hitch angle to one or more of a driver and to on-board control systems of the vehicle and trailer.

16 Claims, 2 Drawing Sheets

SYSTEM AND METHOD FOR HITCH ANGLE ESTIMATION

INTRODUCTION

The present disclosure relates to vehicles generally, and more specifically to trailer and trailer-towing vehicles. Vehicles are often used to transport cargo and/or living and/or working space from location to location, however, in some circumstances the cargo and/or living and/or working spaces cannot fit within the dimensions of the vehicle itself. In such instances, the cargo, living, and/or working spaces may be carried by or provided within a separate trailer which is then movably affixed to and towed by the vehicle. The trailers may also be used to transport cargo in open-air or closed configurations.

While trailers present an ideal means of transporting cargo and/or living and/or working space from location to location, vehicles in combination with the trailers they tow are physically larger than the vehicles on their own. In particular, trailers add significantly to the overall effective length of a vehicle, alter the vehicle's effective turning radius, and the like. Additionally, trailers are commonly hitched at or proximate a rear of a towing vehicle. When a towing vehicle negotiates a turn, the trailer articulates around the hitch, and may have a turning radius different than the vehicle itself. The dimensions of and hitch location may cause the trailer to move relative to the vehicle in a manner that can cause driver confusion, increase parking and driving difficulty for the driver, and so forth. In order to account for the increased effective length and turning radius of the combined vehicle and trailer, and to assist vehicle drivers in determining the location of the trailer relative to the vehicle and on the ground, hitch angle estimations may be used.

Traditionally, vehicles performing hitch angle estimations utilize on-board sensors such as cameras, radars, and ultrasonic sensors to determine the position of the trailer relative to the rear of the vehicle. However, the accuracy of cameras, radars, and ultrasonic sensors may be impacted by weather conditions. That is, cameras, radars, ultrasonic sensors, and the like are effectively visibility-dependent, or situation-dependent. Mud, rain, snow, or the like may partially or completely obscure or obfuscate such on-board sensors. Likewise, translating optical or physical map-data generated by cameras, radars, and ultrasonic sensors into a hitch angle approximation requires significant computer processing.

Accordingly, while trailers achieve their intended purpose, there is a need for a new and improved system and method for improving the accuracy of trailer hitch articulation angle estimations which decreases driver confusion, decreases cost, decreases computer processing costs, provides cross-platform support, simplifies trailer maneuvering, improves driving ease, increases portability, improves robustness and reliability, decreases the potential for jack-knifing, and prevents trailer sway during high speed driving, and which simplifies manufacturing.

SUMMARY

According to an aspect of the present disclosure a system for estimating a hitch angle of a vehicle towing a trailer via a hitch includes a control module having a memory for storing programmatic control logic, a processor in communication with the memory and executing the programmatic control logic, and one or more input/output (I/O) ports. The system further includes one or more sensors, in electronic communication with the I/O ports, the I/O ports in electronic communication with the processor of the control module. A trailering application defines a portion of the programmatic control logic. The trailering application has at least a first control logic and a second control logic. The first control logic estimates the hitch angle based on a first term and a second term and physical parameters of the vehicle and trailer. The second control logic provides the estimated hitch angle to one or more of a vehicle driver and on-board vehicle systems.

According to another aspect of the present disclosure, the one or more sensors further include speed sensors disposed on the trailer and measuring rotational speeds of left and right wheels of the trailer.

According to yet another aspect of the present disclosure, the programmatic control logic further includes a third control logic. The third control logic filters data generated by the one or more sensors to remove perturbations and high frequency content from the data.

According to yet another aspect of the present disclosure, the programmatic control logic further includes a fourth control logic. The fourth control logic compares the data generated by the one or more sensors to a threshold value.

According to yet another aspect of the present disclosure, the fourth control logic compares an average of a rotational speed of the left trailer wheel and a rotational speed of the right trailer wheel to a predetermined threshold value. When the average is greater than the threshold value, the fourth control logic takes the rotational speed of the left trailer wheel and the rotational speed of the right trailer wheel as valid inputs to the first and second control logics. When the average is less than the threshold value, the system refers to a last known estimated hitch angle stored in the memory.

According to yet another aspect of the present disclosure, the programmatic control logic further includes a fifth control logic. The fifth control logic compares an average of a rotational speed of the left trailer wheel and a rotational speed of the right trailer wheel to a speed of the vehicle. When the average of the rotational speeds of the left and right trailer wheels is not substantially equal to the speed of the vehicle, the system refers to a last known estimated hitch angle stored in the memory.

According to yet another aspect of the present disclosure, the estimate of the hitch angle is equal to a difference between an inverse tangent of the first term, and an inverse tangent of the second term.

According to yet another aspect of the present disclosure, the trailer is supported on a trailer axle. The trailer axle extends for a track width measured from the left trailer wheel mounted proximate a left side of the trailer to the right wheel mounted proximate the right side of the trailer, the left and right wheels being independently rotatable relative to one another. The first term is calculated from the rotational speed of the left trailer wheel of the trailer, the rotational speed of the right wheel of the trailer, the track width of the trailer, and a first distance from the trailer axle to the hitch.

According to yet another aspect of the present disclosure, the one or more sensors further include steering angle sensors disposed on the vehicle and measuring and reporting a steering angle of front wheels of the vehicle relative to a longitudinal axis of the vehicle. The second term is calculated from the steering angle of the vehicle, a wheelbase of the vehicle, and a second distance from the hitch to a rear axle of the vehicle. The wheelbase defines a distance separating a front axle of the vehicle from the rear axle of the vehicle.

According to yet another aspect of the present disclosure, when the hitch is mounted at the rear axle of the vehicle the second term is equal to zero.

According to yet another aspect of the present disclosure, the first control logic generates the estimate of the hitch angle according to the following equation:

$$\theta = \tan^{-1}\left[\frac{2D}{T}\left(\frac{\omega_R - \omega_L}{\omega_R + \omega_L}\right)\right] - \tan^{-1}\left(\frac{d}{L}\tan\delta\right).$$

In the equation, $\theta$ is the estimated hitch angle, D is the first distance, T is the track width, d is the second distance, L is the wheelbase, $\delta$ is the steering angle, and $\omega_R$ is the rotational speed of the right trailer wheel, and $\omega_L$ is the rotational speed of the left trailer wheel.

According to yet another aspect of the present disclosure, the second control logic actively and continuously provides the estimated hitch angle as a feedback signal to one or more of an on-board vehicle system and an on-board trailer system. The on-board vehicle and on-board trailer system include one or more of a traction control system, an anti-lock braking system, a tire pressure monitoring system, an electronic stability control system, and a dynamic stability control system. The on-board vehicle and on-board trailer system utilize the estimated hitch angle to reduce or substantially eliminate trailer sway and jackknifing conditions.

According to yet another aspect of the present disclosure, a method for estimating a hitch angle of a vehicle towing a trailer via a hitch includes accessing a trailering application. The trailering application defines programmatic control logic stored in memory of a control module. The control module having a processor for executing the programmatic control logic, and one or more input/output (I/O) ports. The I/O ports are in electronic communication with one or more sensors and with the processor. The one or more sensors are disposed on the vehicle and the trailer. The method measures, by wheel speed sensors disposed on the trailer, rotational speeds of left and right wheels of the trailer. The processor executes a first control logic of the trailering application, the first control logic estimating the hitch angle based on a first term and a second term and physical parameters of the vehicle and the trailer. The processor also executes a second control logic of the trailering application. The second control logic actively and continuously provides the estimated hitch angle to one or more of a driver, the vehicle, and the trailer. The vehicle, the trailer, and the driver utilize the estimated hitch angle to reduce or substantially eliminate trailer sway and jackknifing conditions.

According to yet another aspect of the present disclosure, the method further includes executing, by the processor, a third control logic of the trailering application. The third control logic filters data generated by the one or more sensors and reduces a quantity of or substantially eliminates high frequency content and perturbations from the data.

According to yet another aspect of the present disclosure, the method further includes executing, by the processor, a fourth control logic of the trailering application. The fourth control logic compares a sum of a rotational speed of the left trailer wheel and a rotational speed of the right trailer wheel to the threshold value. When the sum is greater than the threshold value, the method takes the rotational speed of the left trailer wheel and the rotational speed of the right trailer wheel as valid inputs to the first control logic, and when the sum is less than the threshold value, the method utilizes a last known estimated hitch angle stored in the memory.

According to yet another aspect of the present disclosure, the method further includes executing a fifth control logic of the trailering application. The fifth control logic compares an average of rotational speeds of left and right wheels of the trailer to a vehicle speed. When the vehicle speed is substantially equal to the average of the rotational speeds of the left and right wheels of the trailer, the method takes the rotational speeds of the left and right wheels as valid inputs to the first control logic. When the vehicle speed is not substantially equal to the average of the rotational speeds of the left and right wheels of the trailer, utilizing a last known estimated hitch angle stored in the memory.

According to yet another aspect of the present disclosure, the first control logic further includes estimating the hitch angle as a difference between an inverse tangent of the first term, and an inverse tangent of the second term.

According to yet another aspect of the present disclosure, the method further includes calculating the first term from the rotational speed of the left wheel of the trailer, the rotational speed of the right wheel of the trailer, a track width of the trailer, and a first distance from a trailer axle to the hitch. The trailer is supported on the trailer axle. The trailer axle extends for the track width measured from the left wheel mounted proximate a left side of the trailer to the right wheel mounted proximate the right side of the trailer, the left and right wheels independently rotatable relative to one another. The method further includes calculating the second term from a steering angle of the vehicle, a wheelbase of the vehicle, and a second distance from the hitch to a rear axle of the vehicle. The steering angle of the vehicle is measured and reported by steering angle sensors disposed on the vehicle and measuring and reporting a steering angle of front wheels of the vehicle relative to a longitudinal axis of the vehicle. The wheelbase defines a distance separating a front axle of the vehicle from the rear axle of the vehicle. The method further includes setting the second term equal to zero when the hitch is mounted at the rear axle of the vehicle.

According to yet another aspect of the present disclosure, estimating the hitch angle based on a first term, a second term, and physical parameters of the vehicle and the trailer further includes calculating the estimated hitch angle according to the following equation:

$$\theta = \tan^{-1}\left[\frac{2D}{T}\left(\frac{\omega_R - \omega_L}{\omega_R + \omega_L}\right)\right] - \tan^{-1}\left(\frac{d}{L}\tan\delta\right).$$

In the equation, $\theta$ is the estimated hitch angle, D is the first distance, T is the track width, d is the second distance, L is the wheelbase, $\delta$ is the steering angle, and $\omega_R$ is the rotational speed of the right trailer wheel, and $\omega_L$ is the rotational speed of the left trailer wheel.

According to yet another aspect of the present disclosure, a method for estimating a hitch angle of a vehicle towing a trailer via a hitch includes accessing a trailering application. The trailering application defines programmatic control logic stored in memory of a control module. The control module further including a processor for executing the programmatic control logic, and one or more input/output (I/O) ports. The I/O ports are in electronic communication with one or more sensors and with the processor. The one or more sensors are disposed on the vehicle and the trailer. The method further includes measuring, by wheel speed sensors disposed on the trailer, rotational speeds of left and right wheels of the trailer. The method filters data generated by the one or more sensors and reducing a quantity of or substantially eliminating high frequency content and perturbations from the data. The method compares a sum of a rotational speed of the left trailer wheel and a rotational speed of the right trailer wheel to the threshold value. When the sum is greater than the threshold value, taking the rotational speed of the left trailer wheel and the rotational speed of the right trailer wheel as valid inputs. When the sum is less than the threshold value, utilizing a last known estimated hitch angle stored in the memory. The method compares an average of rotational speeds of left and right wheels of the trailer to a vehicle speed. When the vehicle speed is substantially equal to the average of the rotational speeds of the left and right wheels of the trailer, the method takes the rotational speeds of the left and right wheels as valid inputs to a first control logic, and when the vehicle speed is not substantially equal to the average of the rotational speeds of the left and right wheels of the trailer, utilizing the last known estimated hitch angle stored in the memory. The method further includes executing, by the processor, the first control logic of the trailering application. The first control logic estimates the hitch angle as a difference between an inverse tangent of the first term, and an inverse tangent of the second term. The first term is calculated from the rotational speed of the left wheel of the trailer, the rotational speed of the right wheel of the trailer, a track width of the trailer, and a first distance from a trailer axle to the hitch. The second term is calculated from a steering angle of the vehicle, a wheelbase of the vehicle, and a second distance from the hitch to a rear axle of the vehicle, and wherein the second term is equal to zero when the hitch is mounted at the rear axle of the vehicle. The method further includes executing, by the processor, a second control logic of the trailering application. The second control logic actively and continuously provides the estimated hitch angle to one or more of a driver, the vehicle, and the trailer. The vehicle, the trailer, and the driver utilize the estimated hitch angle to reduce or substantially eliminate trailer sway and jackknifing conditions.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
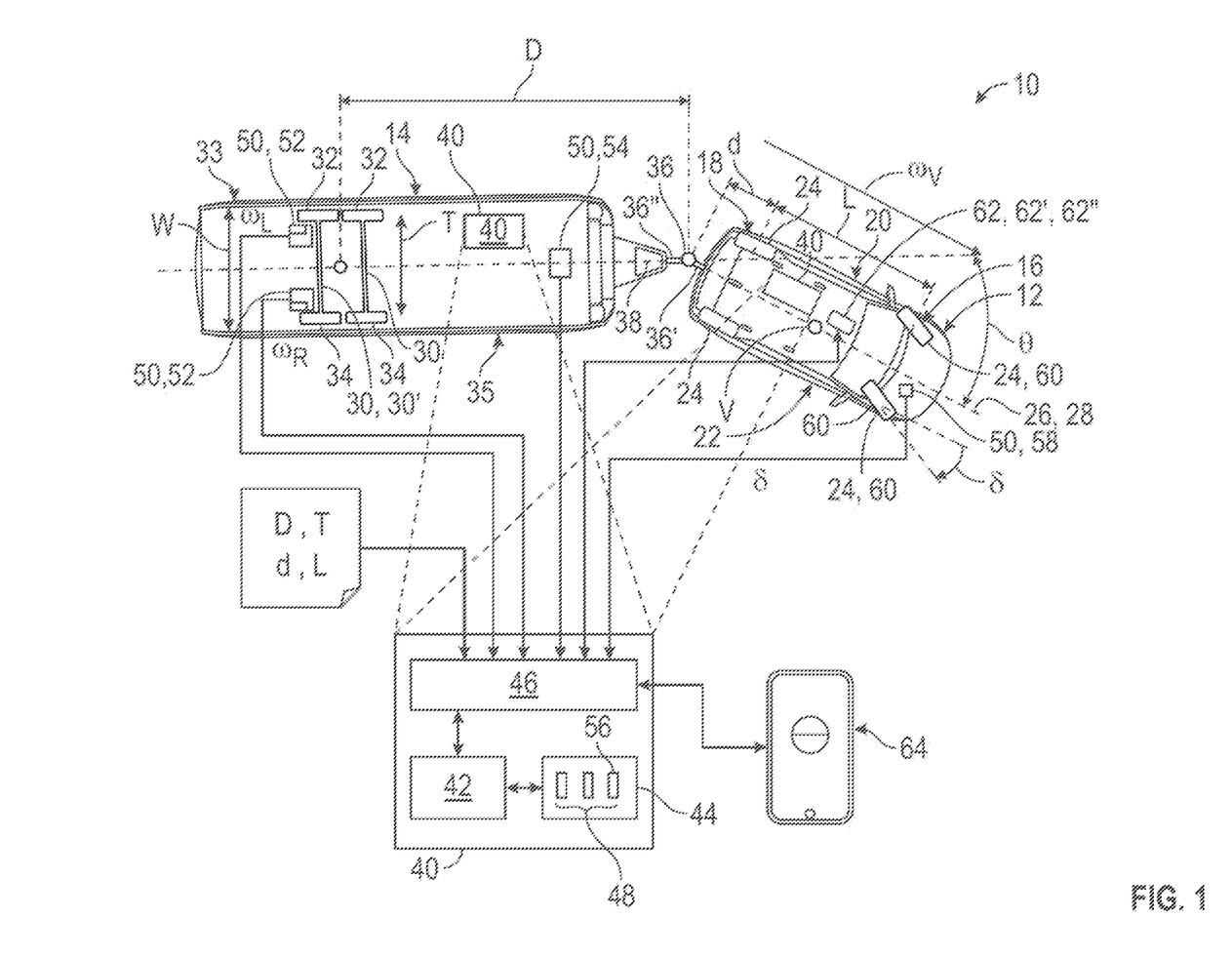
FIG. 1 is a schematic view of a system for estimating a hitch angle relating to a position of a trailer relative to a vehicle coupled to and towing the trailer via a hitch according to an aspect of the present disclosure.

Referring to FIG. 1, a system 10 for hitch angle estimation is shown in schematic view. The system 10 acts in concert with a vehicle 12 towing a trailer 14. While the vehicle 12 is shown as a passenger car or sport utility vehicle (SUV), it should be appreciated that the vehicle 12 may be any type of vehicle without departing from the scope or intent of the present disclosure. In some examples, the vehicle 12 may be a car, a truck, an SUV, a bus, a semi tractor, a tractor used in farming or construction or the like, a pushback tractor or tug, a baggage tractor or cargo tow tractor, or the like. Likewise, while the trailer 14 shown in FIG. 1 is a multi-axle trailer, the trailer 14 may be any of a wide variety of trailer 14 types without departing from the scope or intent of the present disclosure. In some examples, the trailer 14 may be an enclosed or open-air trailer 14 including flatbed trailers, dry vans, refrigerated trailers, lowboy trailers, fifth wheel campers, gooseneck trailers, luggage or cargo trailers, or the like. In further examples, the trailer 14 may be another vehicle 12 as described above, or a vehicle 12 such as a plane, helicopter, or other such aircraft. That is, a vehicle 12 may tow another vehicle 12 as a trailer 14, and multiple trailers 14 may be towed together in single file, or in parallel with one another.

The vehicle 12 may also vary in dimension substantially, depending on vehicle 12 type. However, vehicle dynamics are defined at least in part by certain vehicle dimensions. For example, the vehicle 12 has a wheelbase "L". The wheelbase L defines a distance between a front axle 16 and a rear axle 18 of the vehicle 12. In some exemplary vehicles 10, such as semi tractors, the vehicle may be equipped with a plurality of front axles 16 and/or rear axles 18. Each of the front and rear axles 16, 18 extends laterally across the vehicle 12 from a left side 20 to a right side 22 of the vehicle 12. A vehicle wheel 24 is disposed at the end of each of the front and rear axles 16, 18. Thus, a centerline 26 of the front and rear axles 16, 18 is congruent with the vehicle longitudinal axis 28. The wheelbases L of different vehicles 10 may vary substantially from vehicle 12 type to vehicle 12 type. For example, a bus (not shown) typically has a wheelbase L substantially larger than the wheelbase L of a compact car.

The trailer 14 has one or more trailer axles 30 extending laterally across the trailer 14. The trailer axles 30 support the trailer 14 and extend for a track width "T" from a left trailer wheel 32 proximate a left side 33 of the trailer 14 to a right trailer wheel 34 proximate a right side 35 of the trailer 14. In several aspects, the left and right trailer wheels 32, 34 are independently rotatable relative to one another. The trailer axles 30 of some examples are rigidly, but rotatably mounted to a structure (not specifically shown) of the trailer 14, while in other examples, the trailer axles 30 are mounted to the structure of the trailer 14 via compressible suspension members (not specifically shown). While the trailer 14 shown in FIG. 1 includes two trailer axles 30, 30' it should be appreciated that the trailer 14 may include one trailer axle 30, two trailer axles 30, 30', or greater than two trailer axles 30 without departing from the scope or intent of the present disclosure. In many aspects, the track width T is substantially equal to the full width W of the trailer 14. However, it should be appreciated that the track width T may vary substantially from trailer 14 to trailer 14 and such variations are intended to be within the scope of the present disclosure.

The trailer 14 is movably affixed or mounted to the vehicle 12 via a hitch 36. The hitch 36 allows rotational movement of the trailer 14 relative to the vehicle 12, thus providing the trailer 14 and vehicle 12 means to negotiate turns while in motion. The hitch 36 depicted in FIG. 1 is a ball hitch, however it should be appreciated that other forms of hitches 36 may be used without departing from the scope or intent of the present disclosure. For example, the hitch 36 may be a ball hitch, a receiver hitch, a fifth wheel hitch, a gooseneck hitch, a pintle hitch, a bumper hitch, a weight distribution hitch, or the like. In several aspects, the hitch 36 operates as a pivot point, allowing rotational movement of the trailer 14 relative to the vehicle 12. A first portion 36' of the hitch 36 is rigidly mounted to the vehicle 12, typically along the vehicle longitudinal axis 28, and displaced by a first distance "d" from the rear axle 18. In some examples, such as fifth wheel or gooseneck hitches 36, the first portion 36' of the hitch 36 is located substantially over the center of the rear axle 18 of the vehicle 12. Accordingly, in such examples, the first distance "d" is approximately zero centimeters. However, in other examples such as in ball, receiver, pintle, bumper, and weight distribution hitches 36, the first portion 36' of the hitch 36 is typically located aft of the rear axle 18 of the vehicle 12. Similarly, a second portion 36" of the hitch 36 is rigidly mounted to the trailer 14, typically along a trailer longitudinal axis 38, and displaced by a second distance "D" forward of the trailer axle 30. The second distance D may vary substantially from trailer 14 to trailer 14, and such variations are intended to be within the scope of the present disclosure. In several aspects, in examples in which the trailer 14 has multiple trailer axles 30, 30', the second distance is approximated by an average of the distance from the second portion 36" of the hitch 36 to each of the multiple trailer axles 30, 30'. It is desirable to manage trailer 14 rotational or angular articulation such that the trailer 14 does not physically contact the vehicle 12, or another trailer 14 during forward or reverse turns. Accordingly, in order to manage such articulation, the system 10 estimates an angle $\theta$ of the hitch 36.

Specifically, the system 10 includes one or more control modules 40. The control module 40 is a non-generalized, electronic control device having a preprogrammed digital computer or processor 42, non-transitory computer readable medium or memory 44 used to store data such as control logic, software applications, instructions, computer code, data, lookup tables, etc., and one or more input/output (I/O) ports 46. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium or memory 44 excludes wired, wireless, optical, or other communication links that transport transitory electrical or other signals. A non-transitory computer readable medium or memory 44 includes media where data can be permanently stored and media where data can be stored and later overwritten, such as a rewritable optical disc or an erasable memory device. Computer code includes any type of program code, including source code, object code, and executable code. The processor 42 is configured to execute the code or instructions. In some examples, the control module 40 may be a dedicated Wi-Fi controller or an engine control module, a transmission control module, a body control module, an infotainment control module, etc. The I/O ports 46 are configured to wirelessly communicate using Wi-Fi protocols under IEEE 802.11x, bluetooth communication protocols, radio frequency (RF) protocols, or the like.

In some examples, the control module 40 further includes one or more applications 48. An application 48 is a software program configured to perform a specific function or set of functions. The application 48 may include one or more computer programs, software components, sets of instructions, procedures, functions, objects, classes, instances, related data, or a portion thereof adapted for implementation in a suitable computer readable program code. The applications 48 may be stored within the memory 44 or in additional or separate memory. Examples of the applications 48 include audio or video streaming services, games, browsers, social media, suspension and engine control programs, body control programs, advanced driver assistance system programs, and the like.

The system 10 further includes one or more sensors 50. The sensors 50 produce real-time positioning information regarding the location and/or movement of the trailer 14. In some examples, the sensors 50 are wheel speed sensors 52. The wheel speed sensors 52 of some examples are disposed in the trailer 14. In other examples, the wheel speed sensors 52 are disposed in the vehicle 12 as well. In the example of FIG. 1, the wheel speed sensors 52 are disposed on the trailer axle 30, 30', in or on a mechanical differential (not specifically shown) on the trailer axle 30, 30', or in or on the trailer axle 30, 30'. The wheel speed sensors 52 detect a rotational velocity of each of the left and right trailer wheels 32, 34. Wheel speed sensors 52 may take a variety of different forms and operate in different ways without departing from the scope or intent of the present disclosure. In some examples, the wheel speed sensors 52 are variable reluctance sensors or magneto resistive sensors. In further examples, the wheel speed sensors 52 report wheel speed information to multiple vehicle 12 systems including, traction control system (TCS) systems (not specifically shown), anti-lock braking (ABS) systems (not specifically shown), tire pressure monitoring systems (TPMS) (not specifically shown), electronic stability control (ESC) or dynamic stability control (DSC) systems (not specifically shown), as well as the hitch angle estimation system 10 of the present disclosure.

In additional examples, the sensors 50 may be inertial measurement unit (IMU) sensors 54. IMU sensors 54 measure and report attitude or position, linear velocity, acceleration, and angular rates relative to a global reference frame using a combination of some or all of the following: accelerometers, gyroscopes, and magnetometers. In some examples, IMU sensors 54 also utilize global positioning system (GPS) data to indirectly measure attitude or position, velocity, acceleration, and angular rates. When used in the system 10 of the present disclosure in conjunction with a vehicle 12 and a trailer 14, the IMU sensors 54 measure and report attitude or position, linear velocity, acceleration, and angular rates of the trailer 14 relative to the vehicle 12.

Each of the sensors 50, including wheel speed sensors 52, IMU sensors 54, and the like, measure and report attitude, velocity, and acceleration information as described above. The attitude, velocity and acceleration information (hereinafter "hitch angle information") is transmitted from the sensors 50 to the control module 40 via the I/O ports 46. The I/O ports 46 transmit the hitch angle information to the processor 42. The processor 42 executes an application 48 stored in memory 44 and utilizing the hitch angle information as input to the application 48. Specifically, the processor 42 executes a trailering application 56.

In an example, the trailering application 56 takes several vehicle 12 and trailer 14 outputs as inputs, and calculates a hitch angle estimation as an output for the system 10 and for a vehicle 12 and/or trailer 14 driver or user. Specifically, the trailering application 56 utilizes a steering angle $\delta$, the vehicle wheelbase L, the first distance d, the second distance D, the track width T of the trailer 14, a left rotational speed $\omega_L$ of the left trailer wheel 32 and a right rotational speed $\omega_R$ of the right trailer wheel 34 as inputs. The steering angle $\delta$ is measured and reported by a steering angle sensor 58 to measure and report a steering angle $\delta$ of the vehicle 12. In several aspects, the steering angle $\delta$ is an angle of the front wheels 60 of the vehicle 12 relative to the vehicle longitudinal axis 28. The rotational speeds of the left and right trailer wheels 32, 34 are measured and reported to the control module 40, via the I/O ports 46, by the wheel speed sensors 52.

The processor 42 executes a first control logic in which the trailering application 56 estimates the hitch angle θ. More specifically, the first control logic retrieves the left and right rotational speeds $\omega_L$, $\omega_R$ of the left and right trailer wheels 32, 34, as well as the steering angle δ, the vehicle wheelbase L, the first distance d, the second distance D, the track width T of the trailer 14 from a combination of sensors 50 and known dimensional information that is specific to each vehicle 12 and trailer 14. Specifically, the first control logic approximates the hitch angle θ according to the following equation:

$$\theta = \tan^{-1}(Y1) - \tan^{-1}(Y2) \quad\quad 1)$$

In some examples, data for the first and second terms Y1 and Y2 may be collected from any of a variety of sensors 50, including the wheel speed sensors 52 and IMU sensors 54. The wheel speed sensors 52 of some examples are anti-lock braking system (ABS) sensors, tire pressure monitoring system (TMPS) sensors, or the like. In a non-limiting example, the first term Y1 may be represented as a relationship of left and right rotational speeds $\omega_L$, $\omega_R$ and the dimensions of the trailer 14, while the second term Y2 may be represented as a relationship of the steering angle δ and certain dimensions of the vehicle 12. More specifically, the first and second terms Y1 and Y2 may be represented as follows:

$$Y1 = \left[\frac{2D}{T}\left(\frac{\omega_R - \omega_L}{\omega_R + \omega_L}\right)\right] \quad\quad 2)$$

$$Y2 = \frac{d}{L}\tan\delta \quad\quad 3)$$

Thus, the first term Y1 is equal to the difference of the left and right rotational speeds $\omega_L$, $\omega_R$ divided by the sum of the left and right rotational speeds $\omega_L$, $\omega_R$ and multiplied by two times the second distance divided by the track width T of the trailer 14. Likewise, the second term Y2 is equal to the tangent of the steering angle δ multiplied by the first distance d divided by the wheelbase L of the vehicle 12. Accordingly, when substituted into equation 1) above, the first and second terms Y1, Y2 yield a calculation in which the hitch angle θ is approximately equal to the difference between two inverse tangents terms as follows:

$$\theta = \tan^{-1}\left[\frac{2D}{T}\left(\frac{\omega_R - \omega_L}{\omega_R + \omega_L}\right)\right] - \tan^{-1}\left(\frac{d}{L}\tan\delta\right) \quad\quad 4)$$

However, it should be appreciated that with certain types of trailers 14 such as fifth wheel and gooseneck trailers, the hitch 36 is disposed approximately at the same location as the rear axle 18 of the vehicle 12. Accordingly, when such trailers are used, because the first distance d approaches zero, the second inverse tangent term of the equation above also approaches zero. When the second inverse tangent term of equation 4) above approaches zero, the system 10 may be used independently of a vehicle 12. That is, the system 10 can operate solely with information gleaned from sensors 50 disposed on a trailer 14 when the trailer 14 is a fifth wheel, gooseneck, or other such trailer wherein the hitch 36 is located substantially at or proximate the rear axle 18 of the vehicle 12. Accordingly, the system 10 is trailer 14 based and vehicle 12 independent when the second term of equation 4) approaches zero. Specifically, the equation may be simplified for fifth wheel, gooseneck trailers, and the like as follows:

$$\theta = \tan^{-1}\left[\frac{2D}{T}\left(\frac{\omega_R - \omega_L}{\omega_R + \omega_L}\right)\right] \quad\quad 5)$$

In several aspects, utilizing either the first or the second equations, the first control logic calculates the hitch angle θ estimate. The hitch angle θ estimate closely follows the actual angle θ of the hitch 36. However, under certain conditions the estimated hitch angle θ may depart slightly from the actual hitch angle θ. In some aspects, the estimated hitch angle θ is within about 3° of the actual hitch angle θ when the vehicle 12 and trailer 14 are moving forward. Similarly, the estimated hitch angle θ is within about 5° of the actual hitch angle θ when the vehicle 12 and trailer 14 are moving in reverse. In further aspects, the estimated hitch angle θ is within about 2° of the actual hitch angle θ when the vehicle 12 and trailer 14 are moving either in forward or reverse directions.

A second control logic of the trailering application 56 reports the estimated hitch angle θ to the driver, operator, and/or any of a wide range of other vehicle 12 and trailer 14 control systems in at least one of several different manners. In several aspects, the estimated hitch angle θ is reported as a feedback signal to on-board vehicle 12 and/or trailer 14 systems such as a traction control system (TCS), anti-lock braking (ABS) systems (not specifically shown), tire pressure monitoring systems (TPMS) (not specifically shown), electronic stability control (ESC) or dynamic stability control (DSC) systems (not specifically shown), or the like. The estimated hitch angle θ may then be used in the on-board vehicle 12 and/or trailer 14 systems to maintain vehicle 12 and/or trailer 14 directional stability, to reduce vehicle 12 and/or trailer 14 yaw, prevent or substantially eliminate the potential for jackknifing incidents or for physical contact between the vehicle 12 and trailer 14 to occur, and which, improves resistance to trailer 14 sway, and to thereby increase driver or operator confidence and control over movements of the vehicle 12 and trailer 14. "Yaw", in the context of vehicle 12 and/or trailer 14 movement means a twisting or rotation about a vertical axis "V". In further examples, the estimated hitch angle θ is provided to fusion systems (not specifically shown) equipped of the vehicle 12. Some vehicles 12 are provided with fusion systems which collect information from a variety of different sources to refine or increase the accuracy of fusion system outputs. In a specific example, the vehicle 12 may be equipped with a traditional hitch angle articulation measurement system which relies on optical sensors as well as the hitch angle articulation system 10 described herein. A fusion system equipped to the vehicle 12 combines the optically-based hitch angle θ estimate with the estimate of the hitch angle θ from the hitch angle articulation system 10 to increase the accuracy of the hitch angle θ measurement from both systems.

In several additional aspects, the estimated hitch angle θ is reported via a visual representation of the hitch angle θ on a human-machine interface (HMI), such as a display 62 of the vehicle 12. The display 62 may be an infotainment display 62' located on a center control stack of the vehicle 12, within an instrument cluster 62" of the vehicle, or the like. In another example, the estimated hitch angle θ may be indicated to the driver or operator of the vehicle 12 through audible cues, such as beeps, or other such sounds emitted through a sound system (not specifically shown) of the vehicle 12, or the like. In still further examples, the estimated hitch angle θ is transmitted via either or both of a wired or wireless connection via the I/O ports 46 of the control module 40 to a remote device 64, such as a cellular phone, a tablet computer, or the like. That is, the trailering application 56 of some examples is stored, and executed remotely from the vehicle 12 and the trailer 14, on the driver's or user's cellular phone, tablet computer, laptop, or the like.

In some examples, the processor 42 executes one or more filtering and enabling control logics prior to executing the first and second control logics described above. In a specific example, the processor 42 executes a third control logic of the trailering application 56. The third control logic filters data from the sensors 50 to ensure that the sensor 50 data is accurate. More specifically, the third control logic excludes high frequency or noisy data sent by the wheel speed sensors 52. Such high frequency or noisy data may be generated by sudden movements of the left and right trailer wheels 32, 34 as they traverse perturbances in a road surface, such as potholes, speed bumps, or the like. Additionally, data produced by wheel speed sensors 52 is generated at high frequencies and may therefore include significant quantities of noise. Accordingly, it is useful for wheel speed-based calculations to reduce the quantity of noise in the data by excluding noisy data.

The processor 42, in some examples, subsequently executes a fourth control logic of the trailering application 56. The fourth control logic enables the hitch angle estimation system 10 based on the content of the data from the sensors 50. In an example, the fourth control logic, the trailering application 56 determines whether the trailer 14 is moving at a speed which will result in estimated hitch angles θ of sufficient accuracy. That is, in instances where the hitch angle θ is estimated based on wheel speed sensor 52 data, the left and right rotational speeds $\omega_L$, $\omega_R$ of the left and right trailer wheels 32, 34 must be above a predetermined threshold ε. In a particular example, the fourth control logic calculates an average of the left and right rotational speeds $\omega_L$, $\omega_R$ and compares the average to the threshold value ε. The threshold ε should be understood to be a tunable value which may vary from application to application. In some instances, the threshold value c is set to a speed of approximately zero km/h. That is, when the left and right rotational speeds $\omega_L$, $\omega_R$ average to a rotational speed of approximately zero, the system 10 cannot produce an estimated hitch angle θ. Likewise, because of wheel speed sensor 54 accuracy and precision limitations, obtaining accurate left and right rotational speeds $\omega_L$, $\omega_R$ at very low speeds, for example less than 1 km/h or less than 2 km/h may be difficult. Accordingly, threshold value c of other examples may be set to 1 km/h, 2 km/h, or the like.

In instances when the left and right rotational speeds $\omega_L$, $\omega_R$ average to a rotational speed of approximately zero, the system 10 will refer to the last known estimated hitch angle θ which has been stored in memory 44 of the control module 40. While in the foregoing, the threshold value ε has been discussed as being approximately zero, it should be appreciated that the actual threshold value ε may vary substantially from application to application depending on the physical dimensions of the vehicle 12 and trailer 14, and the like. In a further example, the minimum threshold ε value is below about 1 km/h, below 2 km/h, or the like. However, when the average of the left and right rotational speeds $\omega_L$, $\omega_R$ is greater than the threshold value ε, the trailering application 56 will accept the left and right rotational speeds $\omega_L$, $\omega_R$ as valid inputs.

In some examples, the trailering application 56 then executes a fifth control logic which compares the left and right rotational speeds $\omega_L$, $\omega_R$ of the left and right wheels 32, 34 to known rotational speed values to determine whether the left and right rotational speeds $\omega_L$, $\omega_R$ are accurate and/or possible. More specifically, the fifth control logic compares the left and right rotational speeds $\omega_L$, $\omega_R$ to the speed of the vehicle $\omega_v$ to determine whether or not the left and right rotational speeds $\omega_L$, $\omega_R$ are approximately equal to the speed of the vehicle $\omega_v$. Since the trailer 14 and the vehicle 12 towing the trailer are likely to be moving at substantially the same overall velocity, disparities in the data from the sensors 50 are identified and data sets that fall outside the range of possible speeds are discarded. That is, the known rotational speed values are experimentally determined, predetermined by mathematical calculations utilizing the dimensions T, D, etc., or the like. The fifth control logic compares the measured left and right rotational speeds $\omega_L$, $\omega_R$ to the known and/or mathematically calculated rotational speed values, as well as to the speed of the vehicle $\omega_v$. If the left and right rotational speeds $\omega_L$, $\omega_R$ do not match or fall within the range of known possible rotational speed values relative to the speed of the vehicle $\omega_v$, then the trailering application 56 refers to the last known estimated hitch angle θ which has been stored in memory 44 of the control module 40. The trailering application 56 will then cause the processor 42 to re-poll the wheel speed sensors 52 and re-execute the first and second control logics. However, if the left and right rotational speeds $\omega_L$, $\omega_R$ match or fall within a range of known possible rotational speed values, then the processor 42 executes the first and second control logics as described hereinabove.

It should be appreciated that while the third, fourth, and fifth control logics may be optional in some examples, the inclusion of the third, fourth, and fifth control logics increases the accuracy and precision of hitch angle θ estimates. Furthermore, it should be appreciated that some or all of the third, fourth, and fifth control logics may be used in combination with one another, individually, or with only one of the others in some examples. That is, the third and fourth, the third and fifth, or the fourth and fifth may be used without departing from the scope or intent of the present disclosure. Likewise, it should be appreciated that when the system 10 uses the last known estimated hitch angle θ in accordance with the requirements of the fourth and/or fifth control logics, the system 10 does not necessarily execute the first control logic to calculate the estimated hitch angle θ during that particular control loop. Rather, the system 10 will execute the second control logic and then automatically, continuously, and recursively execute the first and second control logics thereafter, at least until the system 10 is powered off, or the like.

Figure 2:
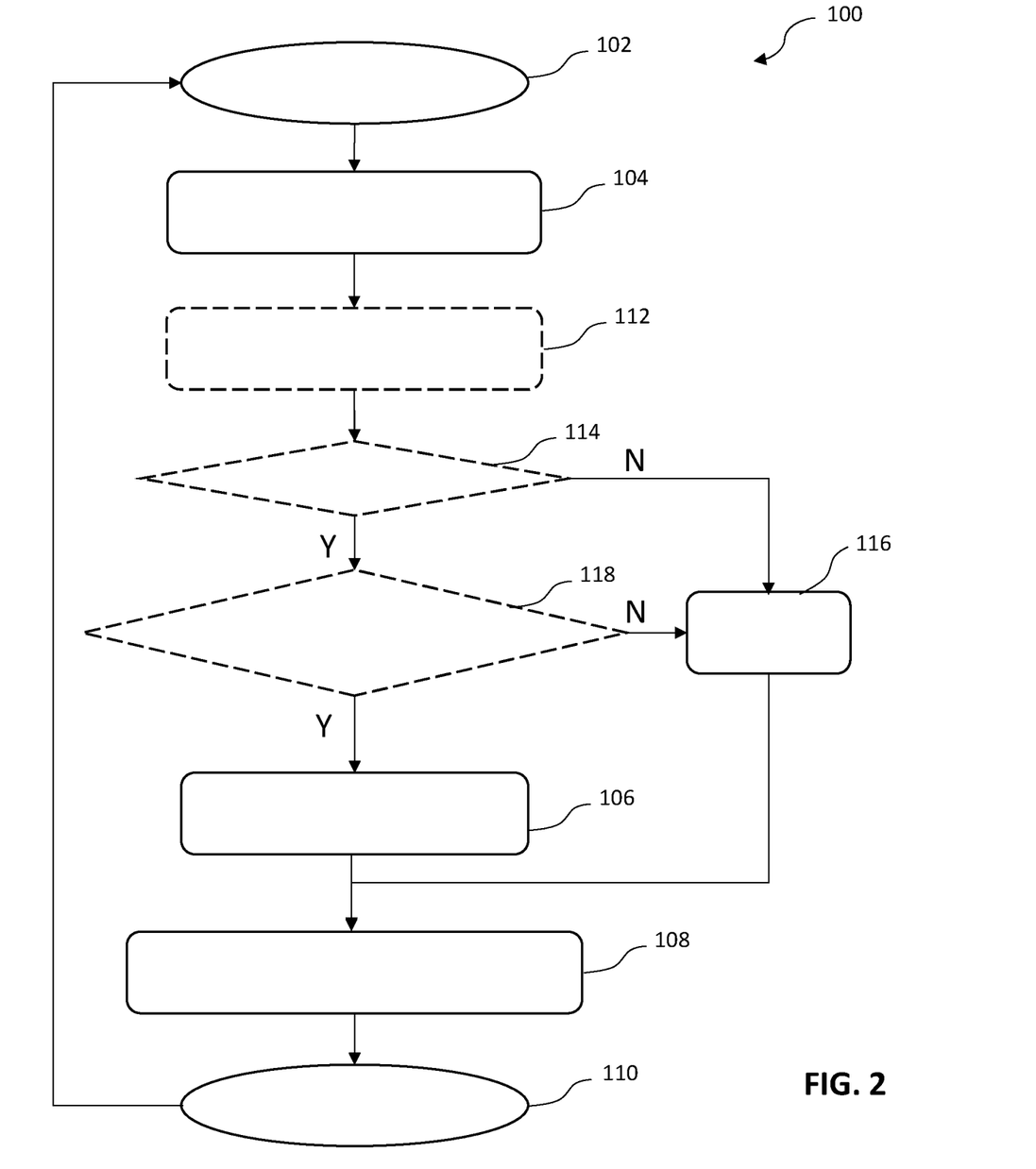
FIG. 2 is a flow chart depicting a method for estimating a hitch angle of a trailer relative to a vehicle coupled to and towing the trailer via a hitch according to an aspect of the present disclosure.

Turning now to FIG. 2, and with continuing reference to FIG. 1, a method 100 of estimating hitch angle θ using the hitch angle estimation system 10 is shown in flowchart form. The method 100 begins at block 102 where a driver or user wishing to tow a trailer 14 with their vehicle 12 accesses the trailering application 56. The trailering application 56 may be accessed on a vehicle display 62, a remote device 64, a combination of both, or the like. At block 104, the trailering application 56 causes the control module 40 to monitor the sensors 50 of the system 10. Specifically, the processor 42 polls the sensors 50 of the system 10 for left and right rotational speeds $\omega_L$, $\omega_R$ of the left and right trailer wheels 32, 34. In some examples, the processor 42 also obtains information from the steering wheel angle sensor 58, wheel speed sensors 54 disposed on the vehicle 12, and the like. The sensors 50 measure and report attitude, velocity, and acceleration information of the vehicle 12 and the trailer 14, or where fifth wheel or gooseneck trailers 14 are used, the sensors may simply measure and report attitude, velocity and acceleration information for the trailer 14 alone.

At block 106, the trailering application 56 causes the processor 42 to execute the first control logic of the trailering application 56 that estimates the hitch angle θ. The first control logic uses the left and right rotational speeds $\omega_L$, $\omega_R$ of the left and right trailer wheels 32, 34 collected in block 104. In some examples, the first control logic also obtains the steering angle δ, the vehicle wheelbase L, the first distance d, the second distance D, the track width T of the trailer 14 from a combination of sensors 50 and known dimensional information that is specific to each vehicle 12 and trailer 14. The first control logic uses the rotational speeds $\omega_L$, $\omega_R$ of the left and right trailer wheels 32, 34, the steering angle δ, the vehicle wheelbase L, the first distance d, the second distance D, the track width T as inputs to the first equation:

$$\theta = \tan^{-1}(Y1) - \tan^{-1}(Y2). \quad 1)$$

In instances in which the first and second terms Y1, Y2 are calculated from wheel speed sensors 52, the first control logic, therefore, calculates the estimated hitch angle via the fourth equation:

$$\theta = \tan^{-1}\left[\frac{2D}{T}\left(\frac{\omega_R - \omega_L}{\omega_R + \omega_L}\right)\right] - \tan^{-1}\left(\frac{d}{L}\tan\delta\right) \quad 4)$$

Similarly, in instances where the first and second terms Y1, Y2 are calculated from wheel speed sensors 52, and the trailer 14 utilizes a fifth wheel or gooseneck hitch 36, the first logic calculates the estimated hitch angle via the fifth equation above:

$$\theta = \tan^{-1}\left[\frac{2D}{T}\left(\frac{\omega_R - \omega_L}{\omega_R + \omega_L}\right)\right] \quad 5)$$

At block 108, the second control logic of the trailering application 56 utilizes the estimated hitch angle θ from the first control logic to report the estimated hitch angle θ to the driver, operator, and/or any of a wide range of other vehicle 12 and trailer 14 control systems in at least one of several different manners. The estimated hitch angle θ is reported as a feedback signal to on-board vehicle 12 and/or trailer 14 systems such as TCS, ABS, TPMS, ESC, or DSC, fusion systems, or the like. The estimated hitch angle θ may then be used in the on-board vehicle 12 and/or trailer 14 systems to maintain vehicle 12 and/or trailer 14 directional stability, to reduce vehicle 12 and/or trailer 14 yaw. More importantly, the estimated hitch angle θ is used to prevent or substantially eliminate the potential for jackknifing incidents or for physical contact between the vehicle 12 and trailer 14 to occur. Such prevention measures improve resistance to trailer sway, and thereby increases driver or operator confidence and control over movements of the vehicle 12 and trailer 14. Likewise, the estimated hitch angle θ is, in some examples, reported directly to the driver or operator of the vehicle 12 and/or trailer 14 via an HMI such as the display 62, remote device 64, or the like.

The trailering application 56 is used when the vehicle 12 and trailer 14 are in motion. Accordingly, the trailering application 56 operates recursively and continuously to automatically update the on-board vehicle systems and/or the driver or operator as to estimated hitch angle θ in real time as the vehicle 12 and trailer 14 move. That is, the after block 108, the method 100 proceeds to block 110, where the method 100 ends and returns continuously and recursively to block 102. At block 102, the method 100 runs until the trailering application 56 is closed, exited, or otherwise powered off, in which case after block 108, the method 100 proceeds to block 110 where the method 100 again stores the last known estimated hitch angle θ in memory 44, and the method 100 ends. In some examples, the trailering application 56 may be automatically engaged as soon as a trailer 14 is hitched to the vehicle 12, and the vehicle 12 is powered on.

In some examples, prior to executing the first and second control logics at blocks 106 and 108, the method 100 performs filtering and enabling steps. The filtering and enabling steps increase the accuracy and precision of estimated hitch angle θ measurements. Specifically, at block 112 the trailering application 56 causes the control module 40 to execute the third control logic. The third control logic filters sensor 50 data to determine if the sensor 50 data is accurate. In examples in which the sensors 50 are wheel speed sensors 52, or the like, the third control logic filters the left rotational speed ωL and the right rotational speed ωR to ensure that the left and right rotational speeds ωL, OR are accurate by removing noise and high frequency data from the data from the sensors 50.

The method 100 then proceeds to block 114, where the trailering application 56 causes the processor 42 to execute the fourth control logic. The fourth control logic determines whether the trailer 14 is in motion. Specifically, the fourth control logic compares the left and right rotational speeds $\omega_L$, $\omega_R$ to the threshold value ε. When the left and right rotational speeds $\omega_L$, $\omega_R$ do not meet the threshold value ε as discussed above, the method 100 returns to block proceeds to block 116, and the trailering application 56 uses a last known estimated hitch angle θ stored in memory 44 of the control module 40. If, however, the threshold value ε is met, the trailering application 56 will cause the processor 42 to proceed to block 118. At block 118, the trailering application 56 causes the processor 42 to execute the fifth control logic.

The fifth control logic compares the speed of the trailer 14 to the vehicle speed $\omega_v$ to determine whether the vehicle 12 and trailer 14 are traveling at approximately the same speed. That is, because the trailer 14 and vehicle 12 are connected at the hitch 36, both should move at substantially the same speed under normal operating conditions. Specifically, the fifth control logic compares an average of the measured left and right rotational speeds $\omega_L$, $\omega_R$ of the left and right trailer wheels 32, 34, and to the speed of the vehicle $\omega_v$. If the left and right rotational speeds $\omega_L$, $\omega_R$ do not match or fall within the range of known possible rotational speed values relative to the speed of the vehicle $\omega_v$, then the fifth control logic of the trailering application 56 will cause the method 100 to utilize last known estimated hitch angle θ stored in memory 44 of the control module 40. Subsequently, the processor 42 will re-poll the sensors 50 for new data. However, when the left and right rotational speeds $\omega_L$, $\omega_R$ match or fall within a range of known possible rotational speed values relative to the speed of the vehicle $\omega_v$, then the method 100 proceeds to block 106, and carries out the first control logic as described above.

It should be appreciated that while the third, fourth, and fifth control logics may be optional in some examples, the inclusion of the third, fourth, and fifth control logics increases the accuracy and precision of hitch angle θ estimates. Furthermore, it should be appreciated that some or all of the third, fourth, and fifth control logics may be used in combination with one another, individually, or with only one of the others in some examples. That is, the third and fourth, the third and fifth, or the fourth and fifth may be used without departing from the scope or intent of the present disclosure. Likewise, it should be appreciated that when the system 10 uses the last known estimated hitch angle θ in accordance with the requirements of the fourth and/or fifth control logics, the system 10 does not necessarily execute the first control logic to calculate the estimated hitch angle θ during that particular control loop. Rather, the method will cause the processor 42 to execute the second control logic and then automatically, continuously, and recursively execute the first and second control logics thereafter, at least until the system 10 is powered off, the method 100 ends at block 110, or the like.

Because the hitch angle estimation system 10 and method 100 of the present disclosure retrieve data from a suite of sensors 50 which is substantially impervious to changeable weather, the system 10 and method are robust and have increased accuracy over optical sensor-based technologies. That is, in relying on wheel speed sensors 52, and/or IMUs 54, weather conditions, dirt, mud, and other detritus which might otherwise obscure optical sensors do not have substantial deleterious effects on the accuracy of the sensor 50 data input into the first and second control logics. Furthermore, the trailering application 56 carries out a sanity check to ensure that the data retrieved from the wheel speed sensors 52, IMUs 54, and the like is not impossible. For example, on an icy road, the left and right wheel speeds $\omega_L$, $\omega_R$ of the left and right trailer wheels 32, 34 may, at least momentarily, inaccurately define the position of the trailer 14 relative to the vehicle 12 if the left and right trailer wheels 32, 34 are sliding over a road surface. Accordingly, because the left and right wheel speeds $\omega_L$, $\omega_R$ of the left and right trailer wheels 32, 34 are continuously compared to the speed of the vehicle $\omega_v$, a disparity between the possible left and right wheel speeds $\omega_L$, $\omega_R$ and the speed of the vehicle $\omega_v$ can be easily determined and omitted from hitch angle θ calculations.

A system and method for hitch angle estimation of the present disclosure offers several advantages. These include imperviousness to inclement weather conditions, portability, the ability to utilize sensors 50 already equipped to vehicles 12 and trailers 14, improved accuracy of trailer hitch 36 articulation angle estimations, decreased driver confusion, decreased cost, decreased computer processing costs, cross-platform support, simplified trailer maneuvering, improved driving ease, reduced potential for jackknifing, improved resistance to trailer sway, portability, improved robustness and reliability, and which simplify manufacturing.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for estimating a hitch angle of a vehicle towing a trailer via a hitch, the system comprising:

a control module having a memory for storing programmatic control logic, a processor in communication with the memory and executing the programmatic control logic, and one or more input/output (I/O) ports;

one or more sensors, including speed sensors disposed on the trailer and measuring rotational speeds of a left trailer wheel and a right trailer wheel, the one or more sensors in electronic communication with the I/O ports, the I/O ports in electronic communication with the processor of the control module; and a trailering application defining a portion of the programmatic control logic, the trailering application having at least a first control logic and a second control logic, wherein the first control logic estimates the hitch angle based on a first term and a second term and physical parameters of the vehicle and trailer, and the second control logic provides the estimated hitch angle to one or more of a vehicle driver and on-board vehicle systems;

a third control logic, wherein the third control logic filters data generated by the one or more sensors to remove perturbations and high frequency content from the data a fourth control logic, wherein the fourth control logic compares an average of a rotational speed of the left trailer wheel and a rotational speed of the right trailer wheel to a predetermined threshold value, and wherein when the average is greater than the threshold value, taking the rotational speed of the left trailer wheel and the rotational speed of the right trailer wheel as valid inputs to the first and second control logics, and wherein when the average is less than the threshold value, the system refers to a last known estimated hitch angle stored in the memory.

2. The system of claim 1 further comprising a third control logic, wherein the third control logic filters data generated by the one or more sensors to remove perturbations and high frequency content from the data.

3. The system of claim 1 further comprising a fifth control logic, wherein the fifth control logic compares an average of a rotational speed of the left trailer wheel and a rotational speed of the right trailer wheel to a speed of the vehicle, and wherein when the average of the rotational speeds of the left and right trailer wheels is not equal to the speed of the vehicle, the system refers to a last known estimated hitch angle stored in the memory.

4. The system of claim 1, wherein the estimate of the hitch angle is equal to a difference between an inverse tangent of the first term, and an inverse tangent of the second term.

5. The system of claim 4, wherein the trailer is supported on a trailer axle, the trailer axle extending for a track width measured from the left trailer wheel mounted proximate a left side of the trailer to the right trailer wheel mounted proximate a right side of the trailer, the left and right trailer wheels being independently rotatable relative to one another, and wherein the first term is calculated from the rotational speed of the left trailer wheel, the rotational speed of the right trailer wheel, the track width of the trailer, and a first distance from the trailer axle to the hitch.

6. The system of claim 5, wherein the one or more sensors further comprise:
steering angle sensors disposed on the vehicle and measuring and reporting a steering angle of front wheels of the vehicle relative to a longitudinal axis of the vehicle, and
wherein the second term is calculated from the steering angle of the vehicle, a wheelbase of the vehicle, and a second distance from the hitch to a rear axle of the vehicle, and
wherein the wheelbase defines a distance separating a front axle of the vehicle from the rear axle of the vehicle.

7. The system of claim 6, wherein when the hitch is mounted at the rear axle of the vehicle the second term is equal to zero.

8. The system of claim 6, wherein the first control logic estimates the hitch angle according to the following equation:

$$\theta = \tan^{-1}\left[\frac{2D}{T}\left(\frac{\omega_R - \omega_L}{\omega_R + \omega_L}\right)\right] - \tan^{-1}\left(\frac{d}{L}\tan\delta\right)$$

where $\theta$ is the estimated hitch angle, D is the first distance, T is the track width, d is the second distance, L is the wheelbase, $\delta$ is the steering angle, and $\omega_R$ is a rotational speed of the right trailer wheel, and $\omega_L$ is a rotational speed of the left trailer wheel.

9. The system of claim 1, wherein the second control logic actively and continuously provides the estimated hitch angle as a feedback signal to one or more of an on-board vehicle system and an on-board trailer system, wherein the on-board vehicle and on-board trailer system comprise one or more of:
a traction control system, an anti-lock braking system, a tire pressure monitoring system, an electronic stability control system, and a dynamic stability control system, wherein the on-board vehicle and on-board trailer system utilize the estimated hitch angle to reduce or eliminate trailer sway and jackknifing conditions.

10. A method for estimating a hitch angle of a vehicle towing a trailer via a hitch, the method comprising:
accessing a trailering application, the trailering application defining programmatic control logic stored in memory of a control module, the control module further including a processor for executing the programmatic control logic, and one or more input/output (I/O) ports, the I/O ports in electronic communication with one or more sensors and with the processor, the one or more sensors disposed on the vehicle and the trailer;
measuring, by wheel speed sensors disposed on the trailer, rotational speeds of left trailer wheel and a right trailer wheel;
executing, by the processor, a first control logic of the trailering application, the first control logic estimating the hitch angle based on a first term and a second term and physical parameters of the vehicle and the trailer;
executing, by the processor, a second control logic of the trailering application, the second control logic actively and continuously providing the estimated hitch angle to one or more of a driver, the vehicle, and the trailer; and
wherein the vehicle, the trailer, and the driver utilize the estimated hitch angle to reduce or eliminate trailer sway and jackknifing conditions; and executing, by the processor, a third control logic of the trailering application, the third control logic comprising:
comparing a sum of a rotational speed of the left trailer wheel and a rotational speed of the right trailer wheel to a threshold value, and
wherein when the sum is greater than the threshold value, taking the rotational speed of the left trailer wheel and the rotational speed of the right trailer wheel as valid inputs to the first control logic, and wherein when the sum is less than the threshold value, utilizing a last known estimated hitch angle stored in the memory.

11. The method of claim 10, further comprising executing, by the processor, a fourth control logic of the trailering application, the fourth control logic comprising:
filtering data generated by the one or more sensors and reducing a quantity of or eliminating high frequency content and perturbations from the data.

12. The method of claim 10, further comprising executing, by the processor, a fifth control logic of the trailering application, the fifth control logic comprising:
comparing an average of rotational speeds of left and right wheels of the trailer to a vehicle speed, and when the vehicle speed is equal to the average of the rotational speeds of the left and right wheels of the trailer, taking the rotational speeds of the left and right wheels as valid inputs to the first control logic, and when the vehicle speed is not equal to the average of the rotational speeds of the left and right wheels of the trailer, utilizing a last known estimated hitch angle stored in the memory.

13. The method of claim 10, wherein the first control logic further comprises:
estimating the hitch angle as a difference between an inverse tangent of the first term, and an inverse tangent of the second term.

14. The method of claim 13, further comprising:
calculating the first term from the rotational speed of the left trailer wheel, the rotational speed of the right trailer wheel, a track width of the trailer, and a first distance from a trailer axle to the hitch,
wherein the trailer is supported on the trailer axle, the trailer axle extends for the track width measured from the left trailer wheel mounted proximate a left side of the trailer to the right trailer wheel mounted proximate a right side of the trailer, the left and right trailer wheels independently rotatable relative to one another; and
calculating the second term from a steering angle of the vehicle, a wheelbase of the vehicle, and a second distance from the hitch to a rear axle of the vehicle, and
wherein the steering angle of the vehicle is measured and reported by steering angle sensors disposed on the vehicle and measuring and reporting a steering angle of front wheels of the vehicle relative to a longitudinal axis of the vehicle, and wherein the wheelbase defines a distance separating a front axle of the vehicle from the rear axle of the vehicle, and
setting the second term equal to zero when the hitch is mounted at the rear axle of the vehicle.

15. The method of claim 14, wherein estimating the hitch angle based on a first term, a second term, and physical parameters of the vehicle and the trailer further comprises:
calculating the estimated hitch angle according to the following equation:

$$\theta = \tan^{-1}\left[\frac{2D}{T}\left(\frac{\omega_R - \omega_L}{\omega_R + \omega_L}\right)\right] - \tan^{-1}\left(\frac{d}{L}\tan\delta\right)$$

where $\theta$ is the estimated hitch angle, D is the first distance, T is the track width, d is the second distance, L is the wheelbase, $\delta$ is the steering angle, and $\omega_R$ is the rotational speed of the right trailer wheel, and $\omega_L$ is the rotational speed of the left trailer wheel.

16. A method for estimating a hitch angle of a vehicle towing a trailer via a hitch, the method comprising:

accessing a trailering application, the trailering application defining programmatic control logic stored in memory of a control module, the control module further including a processor for executing the programmatic control logic, and one or more input/output (I/O) ports, the I/O ports in electronic communication with one or more sensors and with the processor, the one or more sensors disposed on the vehicle and the trailer;

measuring, by wheel speed sensors disposed on the trailer, a rotational speed of the left trailer wheel and a rotational speed of the right trailer wheel;

filtering data generated by the one or more sensors and reducing a quantity of or eliminating high frequency content and perturbations from the data;

comparing a sum of the rotational speed of the left trailer wheel and the rotational speed of the right trailer wheel to a threshold value, and wherein when the sum is greater than the threshold value, taking the rotational speed of the left trailer wheel and the rotational speed of the right trailer wheel as valid inputs, and wherein when the sum is less than the threshold value, utilizing a last known estimated hitch angle stored in the memory;

comparing an average of rotational speeds of left and right wheels of the trailer to a vehicle speed, and when the vehicle speed is equal to the average of the rotational speeds of the left and right wheels of the trailer, taking the rotational speeds of the left and right wheels as valid inputs to a first control logic, and when the vehicle speed is not substantially equal to the average of the rotational speeds of the left and right wheels of the trailer, utilizing the last known estimated hitch angle stored in the memory;

executing, by the processor, a first control logic of the trailering application, the first control logic estimating the hitch angle as a difference between an inverse tangent of a first term, and an inverse tangent of a second term, wherein the first term is calculated from the rotational speed of the left trailer wheel, the rotational speed of the right trailer wheel, a track width of the trailer, and a first distance from a trailer axle to the hitch; and wherein the second term is calculated from a steering angle of the vehicle, a wheelbase of the vehicle, and a second distance from the hitch to a rear axle of the vehicle, and wherein the second term is equal to zero when the hitch is mounted at the rear axle of the vehicle; and executing, by the processor, a second control logic of the trailering application, the second control logic actively and continuously providing the estimated hitch angle to one or more of a driver, the vehicle, and the trailer; and wherein the vehicle, the trailer, and the driver utilize the estimated hitch angle to reduce or eliminate trailer sway and jackknifing conditions.

\* \* \* \* \*